United States Patent [19] [11] Patent Number: 5,263,121
Melsa et al. [45] Date of Patent: Nov. 16, 1993

[54] NEURAL NETWORK SOLUTION FOR INTERCONNECTION APPARATUS

[75] Inventors: Peter J. Melsa; Charles E. Rohrs, both of South Bend; John B. Kenney, Gránger, all of Ind.

[73] Assignee: Tellabs, Inc., Lisle, Ill.

[21] Appl. No.: 758,803

[22] Filed: Sep. 12, 1991

[51] Int. Cl.⁵ .................. G06F 15/18; H04Q 11/04
[52] U.S. Cl. .................................. 395/22; 395/909; 370/54
[58] Field of Search ............ 395/24, 22, 909; 370/54

[56] References Cited

U.S. PATENT DOCUMENTS 4,660,166 4/1987 Hopfield .................... 395/24
4,858,147 8/1989 Conwell ..................... 395/27
4,947,482 8/1990 Brown ....................... 395/24
5,166,927 11/1992 Iida et al. ................... 395/21

OTHER PUBLICATIONS

Melsa et al., "A Neural Network Solution For Routing in Three Stage Interconnection Networks", May 1-3, 1990, pp. 483-486, vol. 1.

Primary Examiner—Allen R. MacDonald
Attorney, Agent, or Firm—Juettner Pyle & Lloyd

[57] ABSTRACT

A neural network solution for routing calls through a three stage interconnection network selects an open path through the interconnection network if one exists. The neural network solution uses a neural network with a binary threshold. The weights of the neural network are fixed for all time and therefore are independent of the current state of the interconnection network. Preferential call placement strategies are implemented by selecting appropriate external inputs to the neural network. An interconnection network controller stores information reflecting the current usage of the interconnection network and interfaces between the interconnection network and the neural network.

13 Claims, 1 Drawing Sheet

NEURAL NETWORK SOLUTION FOR INTERCONNECTION APPARATUS

BACKGROUND OF THE INVENTION

The present invention relates to routing calls through a communications network, and in particular to an improved neural network solution for routing calls through a three stage interconnection network.

A neural network is a parallel, distributed, data processing system. A neural network contains a large number of processing elements or neurons of simple processing capability, the number of neurons being the size of the network. The neurons are connected with each other to form a fully connected, or nearly fully connected network. In general, the network performs parallel data processing based on a constraint satisfaction paradigm that has been shown to lead to collective computation capabilities. A neural network solution refers to a specific neural network architecture and set of interconnection weights that result in a neural network capable of solving a specific problem.

The problem of routing a call through a three stage interconnection network requires the choice of an appropriate route through the interconnection network. Since the problem potentially entails an exhaustive search of all possible paths through the interconnection network, it is a good candidate for the use of a neural network. Others have previously proposed neural network solutions to handle routing problems in communications networks. However, none of such solutions have shown guaranteed convergence to a correct answer and the parameters selected for the neural networks either have not been identified or have been based on trial and error. Also, the prior solutions have required an excessive number of neurons and some of them have disadvantageously allowed circular routes through the communication or interconnection network. In addition, the prior solutions have not provided for preferential call placement, i.e., for the preferential use of certain center sections of an interconnection network when routing calls through the network.

OBJECTS OF THE INVENTION

An object of the present invention is to provide an improved neural network solution for call routing in a three stage interconnection network.

Another object is to provide such a neural network solution that includes preferential call placement in the interconnection network.

A further object is to provide such a neural network solution in which a preferential call placement strategy is implemented through selection of the external inputs to the neural network.

Yet another object is to provide such a neural network solution in which the neural network has guaranteed convergence properties.

A still further object is to provide such a neural network solution in which fixed interconnection weights are used, regardless of the state of the interconnection network, so that as calls are routed and/or removed from the interconnection network only the external neural network inputs change, not the interconnection weights.

Still another object is to provide such a neural network solution that requires a minimum number of neurons for its implementation.

SUMMARY OF THE INVENTION

The present invention provides a system for and a method of routing calls through an interconnection network that has input, center and output stages, each stage having a plurality of call switching sections. The center stage has n switching sections and a plurality of links are between the stages, such that there is one link between each input stage switching section and each center stage switching section and one link between each center stage switching section and each output stage switching section.

A neural network selects a route through the interconnection network for each new call. The neural network has n amplifiers, each of which represents an individual one of the center stage switching sections. The amplifiers are coupled together by interconnection weights $T_{ij}$ that are the value or weight of the connection from the output of the jth amplifier to the input to the ith amplifier. The amplifiers receive external inputs $I_i$, where $I_i$ is the external input to the ith amplifier, and generate outputs $v_i$, where $v_i$ is the output generated by the ith amplifier. The neural network has an energy function defined by $$E = -\frac{1}{2} \sum_{\substack{i=1 \\ j \neq i}}^{n} \sum_{j=1}^{n} T_{ij} v_i v_j - \sum_{i=1}^{n} I_i v_i.$$

A controller is coupled to the interconnection network and to the neural network. The controller monitors the current usage of and operates the interconnection network to route calls through the interconnection network. The controller also provides external inputs $I_i$ to and receives outputs $v_i$ from the neural network. The controller stores sets of energy values $W_i^{IN}$ and $W_i^{OUT}$, where $i = 1, 2, \ldots n$, and assigns the energy values to the links coupled to each input stage switching section and to the links coupled to each output stage switching section, respectively, where $W_i^{IN}$ represents the energy involved in using the link between a particular input stage switching section and the ith center stage switching section and $W_i^{OUT}$ represents the energy involved in using the link between the ith center stage switching section and a particular output stage switching section. The assigned energy values are such that if a link is not being used and is available for use in routing a new call through the interconnection network, its energy value $W_i^{IN}$ or $W_i^{OUT}$ is $S_i/2$, where $S_i/2 \geq 0$, and if a link is being used and is not available for use in routing a new call, its energy value is $L/2$, where $L/2 > 0$ and $L > S_i$. The values of $W_i^{IN}$ and $W_i^{OUT}$ are therefore in accordance with and represent the current usage of the interconnection network links.

The neural network interconnection weights have values such that $$T_{ij} = \begin{cases} -G \text{ if } i \neq j \\ 0 \text{ if } i = j \end{cases}$$

so that $dE/dt \leq 0$ for all time and the neural network, in response to its current state and the current values of the external inputs $I_i$, converges to an equilibrium point of the E function. In response to a request to route a new call through the interconnection network, from a particular input stage switching section to a particular output stage switching section, the controller utilizes the energy values $W_i^{IN}$ and $W_i^{OUT}$ assigned to the links coupled to the particular input and output stage switching section to generate and apply to the neural network the external inputs $I_i$, which have values defined by $$I_i = -(W_i^{IN} + W_i^{OUT}) + G,$$

where G is positive constant chosen such that $G < L/2$ and $G > S_i$ for all i. With the above values for $T_{ij}$ and $I_i$, an equivalent definition of the energy function E of the neural network is defined by $$E = \sum_{i=1}^{n} (W_i^{IN} + W_i^{OUT}) v_i + \frac{G}{2} \left( \sum_{i=1}^{n} v_i - 1 \right)^2 - \frac{G}{2} \sum_{i=1}^{n} (v_i^2) - \frac{G}{2}.$$

The external inputs $I_i$ applied by the controller to the neural network cause the neural network to converge, in accordance with the current state of the neural network and the values of the external inputs $I_i$, to an equilibrium point at which the outputs $v_i$ from the neural network amplifiers represent a particular center stage switching section between which and each of the particular input and output stage switching sections there are unused links and through which the new call is to be routed over such unused links. The controller receives the outputs $v_i$ and operates the interconnection network, in accordance with the values of the outputs $v_i$, to route the new call through the particular center stage switching section selected for use by the neural network.

The neural network has a binary threshold and the outputs $v_i$ of the amplifiers are either zero or one. Upon the neural network reaching an equilibrium point following a request to route a new call through the interconnection network, the amplifier outputs $v_i$ indicate whether the new call can be routed through the interconnection network and, if so, which center stage switching section i is to be used to route the new call. In the equilibrium state of the neural network the outputs $v_i$ are such that no more than one amplifier indicates a center stage switching section to be used in routing the new call through the interconnection network.

The invention contemplates the preferential placement of calls through the interconnection network. To implement one form of preferential call routing, the same value of L is assigned to all interconnection network links that are being used and the values of $S_i$ assigned to the links not being used are such that $S_i < S_j$, to thereby favor selection by the neural network of any particular center stage switching section i over any other center stage switching section j for use in routing a new call through the interconnection network. If the values assigned to $S_i$ are such that $S_i < S_j$ for all $i < j$, then a form of preferential call placement is implemented that favors selection of the lowest numbered unused center stage switching section for use in routing a new call through the interconnection network. If preferential call placement is not desired, then the same value of L is assigned to all links that are being used to route a call and the values of $S_i$ are set to a constant S for all links that are not being used to route a call, which results in a uniform distribution of calls through the center stage switching sections.

The foregoing and other objects, advantages and features of the invention will become apparent upon a consideration of the following detailed description, when taken in conjunction with the accompanying drawings.

DETAILED DESCRIPTION

Figure 2:
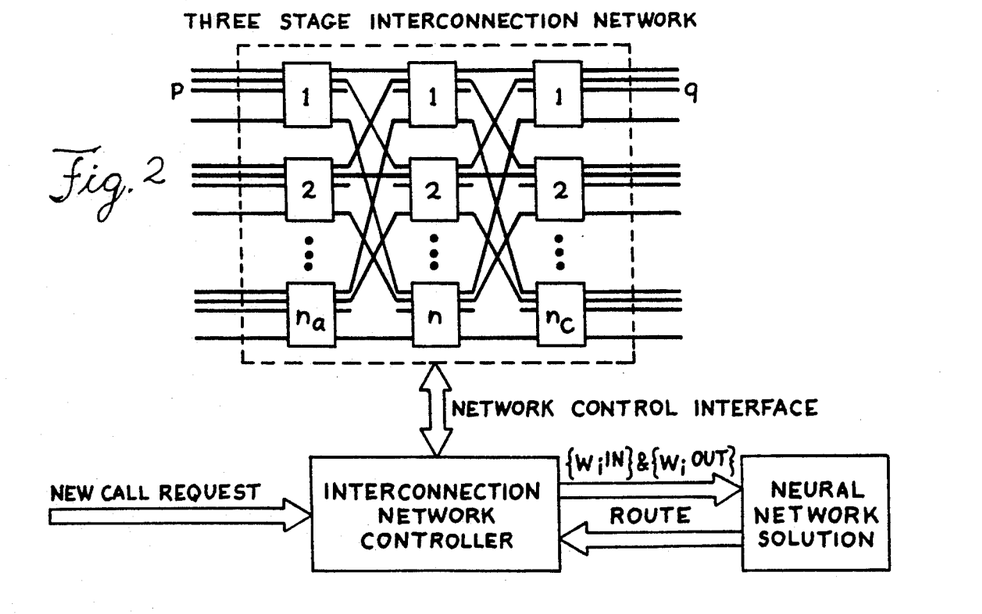
FIG. 2 illustrates a circuit configuration for using the neural network solution to handle a routing function for an interconnection network.

A neural network solution according to the teachings of the invention can be used with any three stage interconnection network, e.g., a three stage Clos network as shown in FIG. 2. The interconnection network consists of an input, a middle and an output stage, each of which comprises a number of rectangular switching matrices. A rectangular switching matrix, also called a section, connects each of x inputs to the section with any one of y outputs from the section, with no two inputs going to the same output. The input stage consists of $n_a$ sections, each having p inputs and n outputs. The center stage consists of n sections each having $n_a$ inputs and $n_c$ outputs. The output stage consists of $n_c$ sections each having n inputs and q outputs. There is one link between each input section and each center section, and one link between each center section and each output section. To route a call, which is a desired connection from an input to an input section to an output from an output section, a center section with an available link to both the appropriate input section and to the appropriate output section must be located. This problem potentially requires an exhaustive search of all possible pairs of links (input-to-center and center-to-output) to find a center section that may be used. A center section with both appropriate links available is referred to as an "open" center section. If either link is currently in use, then the center section is referred to as "used." A valid route uses a single "open" center section between appropriate input and output sections.

Figure 1:
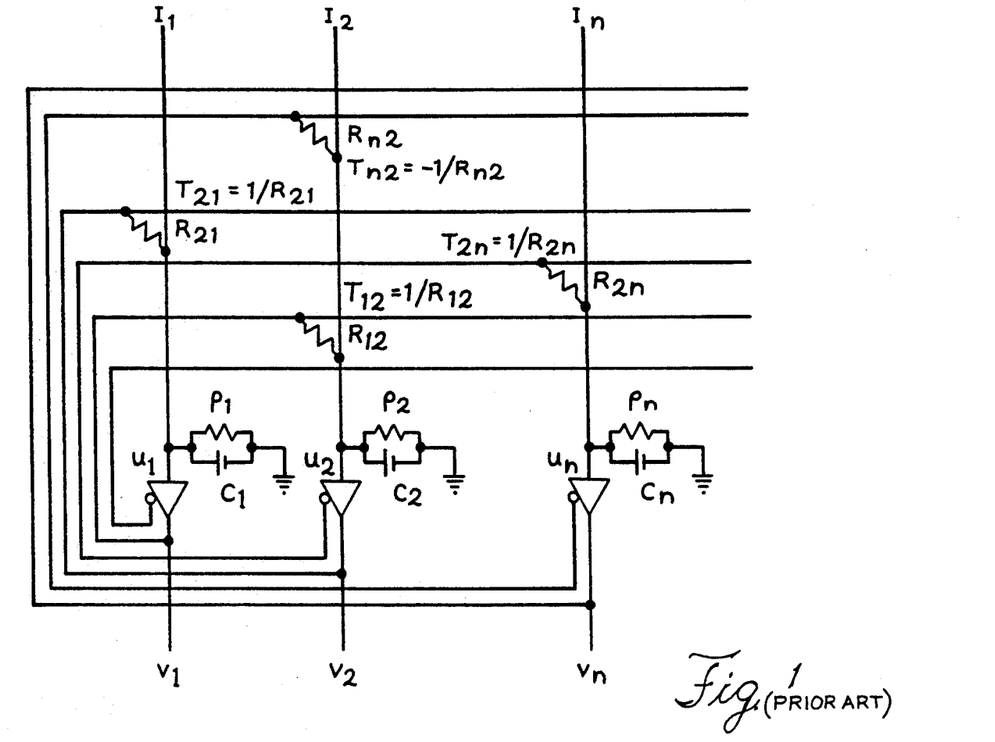
FIG. 1 shows the architecture of a conventional neural network that may be used in practicing the present invention.

FIG. 1 shows the architecture of a known continuous deterministic Hopfield neural network that may be used in the neural network solution for routing calls in the three stage interconnection network. The neural network has a plurality of amplifiers, i.e., neurons, the inputs to and the outputs from which are described by nonlinear dynamical equations. The equation describing the input $u_i$ to the ith amplifier is $$C_i \left( \frac{du_i}{dt} \right) = \sum_j T_{ij} v_j - \frac{u_i}{\tau_i} + I_i \text{ with } v_i = g_i(u_i) \quad (1)$$

where $C_i$ is the total input capacitance of the amplifier, $T_{ij}$ is the value or weight of the connection from the output of the jth amplifier to the input to the ith amplifier, $v_j$ is the output generated by the jth amplifier, $\tau_i$ is a resistance value that will be defined below, $g_i()$ is the sigmoidal transfer function of the ith amplifier assuming a negligible response time, and $I_i$ is the external input to the ith amplifier. In order to allow $T_{ij}$ to have both negative and positive values, the amplifiers have both noninverting and inverting outputs. When a negative $T_{ij}$ is needed, the inverting output of the amplifier is used and when $T_{ij}$ is to be positive, the noninverting output is used. The magnitude of $T_{ij}$ is $1/R_{ij}$, where $R_{ij}$ is the value of the resistor connecting the output of the jth amplifier with the input of the ith amplifier. The value of $\tau_i$ is given by $$\frac{1}{\tau_i} = \frac{1}{\rho_i} + \sum_j \frac{1}{R_{ij}},$$

where $\rho_i$ is the input resistance of the amplifier.

The current state of the neural network, i.e., the present state of the outputs of the amplifiers or neurons taken collectively, and equation (1), together deterministically describe the neural network's operation. The choice of values for the external inputs $I_i$ and the interconnection strengths $T_{ij}$ determine the properties of equation (1) and therefore the operational characteristics of the neural network. In general, the interconnection strengths are fixed prior to operation of the neural network.

Assuming an infinite gain on the sigmoidal function, the following positive-definite function represents the energy for the system defined by equation (1):

$$E = -\frac{1}{2} \sum_i \sum_{j \neq i} T_{ij} v_i v_j - \sum_i I_i v_i. \quad (2)$$

For $T_{ij} = T_{ji}$ and $T_{ii} = 0$, $dE/dt \leq 0$ for all time. In addition, $dE/dt = 0$ only when $dv_i/dt = 0$ for all i. Since E is a bounded function, the solution always leads to an equilibrium point of the E function, and the points where $dv_i/dt = 0$ are asymptotically stable equilibrium points for E. The use of the neural network in a neural network solution requires choosing $T_{ij}$ and $I_i$, such that the local minima of the E function correspond to the correct solution(s) for the problem. One standard design method involves choosing a positive definite function E, which encompasses the constraints of the specific problem at hand. This function, when equated with the general E function in equation (2), determines the correct values for $T_{ij}$ and $I_i$. The operation of the neural network involves specifying an initial state and allowing the state to change dynamically according to equation (1). The local minimum to which the E function converges corresponds to the neural network's solution.

Others have previously employed neural network solutions to handle routing problems in communications networks. None of such prior approaches has shown guaranteed convergence to a correct answer, and the choices of parameters either have not been indicated or have been based largely on trial and error. The prior approaches also use more neurons than are required for the neural network solution of the present invention, and some disadvantageously allow circular routes through the communications or interconnection network. They also have not allowed for preferential call placement.

The neural network solution of the invention uses a neural network of a type shown in FIG. 1, with a binary threshold function rather than a sigmoidal function. The possible output values for a neuron (amplifier) are zero and one. The neural network uses only one neuron per center section, the ith neuron representing the ith center section. The present state of the output $v_i$ of each neuron indicates whether the corresponding center section is to be used in routing the call. By convention, $v_i = 1$ when the section is to be used and $v_i = 0$ when it is not to be used. The final state of the neural network is therefore a valid solution if there is exactly one neuron with an output of one and if that neuron represents an open center section. If there are no open center sections, the solution should not attempt to use any of the center sections, i.e., all neurons should have an output of zero. When routing a call between an input section and an output section, only the links between those two sections and each of the center sections is important. The links associated with any other input or output section do not affect the availability of the required pair of links to route the call.

To describe the manner in which the neural network solution routes a call through the three stage interconnection network, let $W_i^{IN}$ represent the cost or energy associated with using the link between the appropriate input section and the ith center section and let $W_i^{OUT}$ represent the cost or energy associated with using the link between the ith center section and the appropriate output section. If a link is available its cost, $W_i^{IN}$ or $W_i^{OUT}$, is assigned a small value of $S_i/2 \geq 0$, and if a link is being used its cost is assigned a large value of $L/2 > 0$, with $L > S_i$. The values of $S_i$ may be chosen to implement preferential call placement, as will be described. The value of L is the same for all links. If any link is initially available and then a call is routed using that link, the value for $W_i^{OUT}$ or $W_i^{IN}$ changes from $S_i/2$ to $L/2$. The reverse takes place if a link is currently in use and then made available. If a link is not present in the interconnection network, its energy level $W_i^{IN}$ or $W_i^{OUT}$ is assigned a constant value of $L/2$. In this fashion, $W_i^{OUT}$ and $W_i^{IN}$ will contain all the necessary information about the current usage of all of the links in the interconnection network.

An energy function encompassing the constraints of the routing problem can be written $$E = \sum_{i=1}^{n} (W_i^{IN} + W_i^{OUT}) v_i + \frac{G}{2} \left( \sum_{i=1}^{n} v_i - 1 \right)^2 - \quad (3)$$

$$\frac{G}{2} \sum_{i=1}^{n} (v_i^2) - \frac{G}{2},$$

where G is a positive constant chosen such that $G < L/2$ and $G > S_i$ for each i. The first term is the cost associated with using the route. The second term is the cost associated with using more than one center section. When the neural network reaches a local minimum of the energy function representing a valid route, the second term is zero and the first term represents the cost of using the route, i.e., $S_i$. If an open route does not exist, then the first term is zero and the second term equals $G/2$. The third term is added so that $T_{ii} = 0$, ensuring that the neural network solution is guaranteed to find an equilibrium point. The addition of the third term does not alter the locations of the local minima for the neural network solution. The fourth term is simply an offset to the energy of the neural network which does not affect the characteristics of the neural network solution but simplifies subsequent equations.

Since a binary threshold function is used, the energy function for the neural network is given by equation (2). Expanding and combining terms, equation (3) can be rewritten as $$E = \sum_{i=1}^{n} [(W_i^{IN} + W_i^{OUT}) - G]v_i + \frac{G}{2} \sum_{i=1}^{n} \sum_{\substack{j=1 \\ j \neq i}}^{n} v_i v_j \quad (4)$$

Comparing equation (4) with equation (2), $T_{ij}$ and $I_i$ are found to be $$T_{ij} = \begin{cases} -G \text{ if } i \neq j \\ 0 \text{ if } i = j \end{cases} \quad (5)$$

$$I_i = -(W_i^{IN} + W_i^{OUT}) + G. \quad (6)$$

The weights $T_{ij}$ for the neural network are fixed and independent of the current mix of used and unused links, i.e., of the current state of the interconnection network and therefore of the current values for each $W_i^{OUT}$ and $W_i^{IN}$. This is an important advantage if the neural network solution is implemented in VLSI hardware. The external inputs $I_i$ to the neurons reflect all the need information about which links are available and which links are used.

If one or more valid routes exist through the interconnection network, and if $G<L/2$ and $G>S_i$ for each i, then the neural network solution defined by equations (4), (5) and (6) is guaranteed to converge to a solution representing a valid route. If a valid route does not exist, then the solution is guaranteed to converge to a null state, indicating that no valid routes exist. Thus, for all states of the interconnection network, the neural network solution is guaranteed to converge to a state representing a valid route if one exists and to converge to a null state if no valid routes exist. The null state is a state with all neurons having an output of zero.

Call packing or preferential call placement is used to delay the need for rearrangements in rearrangingly nonblocking interconnection networks and to avoid blocked conditions in blocking interconnection networks. By packing the calls as much as possible onto a selected subset of the center sections, situations where a call would be blocked can be avoided. For example, a call packing strategy for the interconnection network shown in FIG. 2 is to route the call by using the lowest numbered "open" center section. This strategy tends to maximize the chance that a route will exist for a call, since the higher numbered center sections will be more likely to have low utilization and hence be "open" center sections. Another use of preferential call placement is to uniformly distribute the calls over the interconnection network.

The invention contemplates preferential call placement through the interconnection network, which is implemented through the choices of the values for $S_i$. To favor any particular center section i over any other center section j, make $S_i<S_j$. For example, to implement a call packing strategy where the "open" center section with the lowest number is favored for use, make $S_i<S_j$ for all $i<j$. Performance of the preferential call placement strategy depends upon the choice of the initial conditions for the neural network. Two such choices are that the initial condition for a new call be the final state from the previous call, or that a reset circuit be added to the neural network to initialize, for each new call, all neurons to the same identical state.

Operation of the neural network for either set of initial conditions can be appreciated by examining the dynamics driving each of the neurons in the neural network. Consider time intervals during which no neuron's output $v_i$ changes, i.e., the time from when one neuron's input changes sign to the time when another neurons's input changes sign. During one such interval none of the $v_i$ change and assuming, without a loss of generality, that $\tau_i = \tau = 1$ and $C_i = 1$, equation (1) can be rewritten as $$\frac{du_i}{dt} = -u_i + \gamma_i \quad (7)$$

where $$v_i = g_i(u_i) \text{ and } \gamma_i = \sum_{\substack{j=1 \\ j \neq i}}^{n} T_{ij} v_j + I_i. \quad (8)$$

For the neural network solution presented by equations (3) through (6), $$\gamma_i = -(W_i^{IN} + W_i^{OUT}) + G\left(1 - \sum_{\substack{j=1 \\ j \neq i}}^{n} v_j\right). \quad (9)$$

The input $u_i$ to the ith neuron is a function only of quantities associated with that neuron. Letting $t_o$ represent the time at which the last neuron's output changed and $u_i(t_o)$ the input to the ith neuron at that time, the solution to equation (7) is $$u_i(t) = \gamma_i + K_i e^{-t} \text{ where } K_i = u_i(t_o) - \gamma_i. \quad (10)$$

Setting $u_i(t) = 0$ and solving for t gives the time at which the ith neuron's output would change if no other neuron's output changes first. A solution only exists when $\gamma_i$ and $K_i$ have opposite signs and $|\gamma_i| < |K_i|$. If a solution exists, the time at which the ith neuron changes state is $$t_i = \ln\left(\frac{\gamma_i - u_i(t_o)}{\gamma_i}\right) \text{ if } \gamma_i \neq 0. \quad (11)$$

Even if a neuron's output cannot change during one interval, it may be able to change during future intervals, since the value of $\gamma_i$ may be different in different intervals.

The neural network converges to a steady state representing the routing solution for a call, i.e., either a single neuron is on, indicating which center section is to be used, or all of the neurons are off, indicating a blocked call. Once the neural network is in a steady state, each of the inputs to the neurons approaches an asymptotic value equal to $\gamma_i$. When a neuron is on in the converged steady state, its asymptote is $\gamma_i = -S_i + G$, while the other neurons have $\gamma_i = -(W_i^{IN} + W_i^{OUT})$. If the final steady state has all neurons off, then each center section is "used" and $\gamma_i = -(W_i^{IN} + W_i^{OUT}) + G$ for all i.

The output of the ith neuron will change before all other neurons if $t_i < t_j$ for all $j \neq i$. Using this relationship, a condition on $u_i(t_o)$ can be found for which the output of the ith neuron will change before all other neurons.

$$u_i(t_o) > \frac{\gamma_i}{\gamma_j} u_j(t_o) \text{ for all } j \neq i \text{ if } \gamma_i > 0 \quad (12)$$

OR $$u_i(t_0) < \frac{\gamma_i}{\gamma_j} u_j(t_0) \text{ for all } j \neq i \text{ if } \gamma_i < 0. \quad (13)$$

Equations (12) and (13) are valid only if the ith neuron has a solution to equation (10) for the current interval, i.e., if the output of the ith neuron is allowed to change during the current interval. If the jth neuron's output cannot change during the current interval, but the ith neuron's output can change, then for all i≠j the ith neuron's output will always change before the jth neuron's output. The sign of $\gamma_i$ depends upon the state of all of the other neurons, i.e., the $v_j$ for all j≠i, as well as upon the values of $W_i^{IN}$ and $W_i^{OUT}$. If none of these other neurons have an output of one, i.e., $v_j=0$ for all j≠i, and if the ith center section is "open", then $\gamma_i$ is positive. In all other cases, $\gamma_i$ is negative. The ratio of $\gamma_i$ to $\gamma_j$ and the signs of $u_i(t_0)$ and $u_j(t_0)$ will determine the region of initial conditions for which the ith neuron will change state before the jth neuron.

Consider first the implementation of preferential call placement where the final state of the neural network from the previous call is used as the initial condition for the new call. It is important to remember that the $W_i^{IN}$s and $W_i^{OUT}$s used for routing the last call are not the same as those used to route the new call. It is the $W_i^{IN}$s and $W_i^{OUT}$s for the last call, not the new call, that affect the initial condition used for the new call. Since the initial condition used for routing a new call is the final state of the last solution, one of two things happens when routing a new call: either the center section which was used to route the last call is "open" for the new call and is used to route the new call, or the center section which was used to route the last call is "used" for the new call and the output of neuron N representing that center section first changes from one to zero. If the latter occurs, the change leaves the neural network in the state where all neurons are off. If none of the center sections are "open," then none of the neurons is able to change its state. Only one neuron at a time can change state, and during the interval in which the output of neuron N is changing from one to zero, no other neurons are able to change state. Their inputs may change due to a change in their $\gamma_i$, but none of those neurons will change state. When the output of neuron N does change, each of the other neurons has a change in its $\gamma_i$ which allows for the possibility that it may be the next to change state. Equations (12) and (13) determine which of these other neurons changes state first. In order that the neuron representing the "open" center section with the lowest $S_i$, $S_{min}$, changes first, the following condition has to be met $$-L > \left(\frac{-S_{min} + G}{-S_{next} + G}\right)(-S_{next}) \quad (14)$$

where $S_{next}$ is that of the "open" center section with the next lowest $S_i$. This represents a worse case condition. The center section which has the highest preference may have been "used" for the last call routed, so that its asymptote is $-L$. The center section with the next highest preference may not have been used for the last call, since the center section used for the call prior to the last call may have been "open" for the last call. If the condition in equation (14) is met for each center section with respect to all center sections with lower preference, then the preferred "open" center section will always be used, except when the center section used for the last call is "open" for the new call.

If calls are not to be preferentially placed, $S_i$ is set equal to a constant S for all i. This gives each of the neurons representing "open" center sections for the last call the same asymptotic value and, if "open" for the next call, an equal chance of being the first neuron to change. With no structural advantage for any neuron, random noise conditions determine the first neuron to change. If the noise has the same distribution for each neuron, the calls will be distributed uniformly among the "open" center sections. The same exception holds in this case, however, that the call is routed using the same center section used for the last call if that section also is "open" for the new call.

There are two situations when preferential placement of calls is not guaranteed. The first occurs during routing of the initial call. If the initial starting point for the very first call is randomly chosen, then there is a greater chance, but no guarantee, that the preferred center section will be used. For every call routed after the first call, the preferential placement of calls will occur as above described. The second situation occurs when there is a change in the preferences. It takes one call placement for the neural network to reflect the changes in the asymptotic values, so for the first call following the change in preferences, the neural network is not guaranteed to use the preferred center section. For every call routed after the first call following the change in preferences, the preferential placement of calls then occurs as described above.

One assumption that has been implied is that sufficient time is allowed for the input to each neuron to get close to its asymptote. The length of time must be sufficient to guarantee that each neuron's input is within a specified neighborhood of its asymptote, a neighborhood that does not overlap with those of adjacent asymptotes. A lower bound on this time may be computed as a function of the separation between adjacent asymptotes. When sufficient time has elapsed, it is assured that the ordering of the inputs matches the ordering of the $\gamma_i$, and thus of the $S_i$. Once the values for the $W_i^{IN}$s and $W_i^{OUT}$s and G are chosen, the length of time can be calculated using worst case scenarios.

Alternatively, preferential call placement may be implemented by using a reset circuit to initialize each neuron to the same state, which alleviates the problem involved in using the final state of the last call as the initial condition for the new call. The reset circuit initializes each neuron's input $u_i$ to the same negative value, so that each neuron has an output of zero. Equations (12) and (13) are still valid and dictate which neuron will change state first. Since each neuron starts with the same initial condition, the neuron representing the highest preference "open" center section is always used, irrespective of the center section used to route the previous call. With the addition of a reset circuit, the performance of the preferential call placement stragedy is guaranteed.

With the reset circuit, if calls are not to be preferentially placed then $S_i$ is set equal to a constant S for all i. Under the assumptions of no structural advantages and equal noise distributions, calls will then be distributed uniformly among the "open" center sections. With the reset circuit, preferences can be changed from call to call with no delay, i.e., preferences are reflected immediately in the neural network's solution. The preferences also are reflected in the route chosen for the initial call.

FIG. 2 shows a contemplated arrangement for using the neural network solution to handle the routing function for the interconnection network. A primary purpose of the interconnection network controller is to maintain two tables. The first table is a list of each call currently using the interconnection network and its route. The second table contains an entry for each input and an entry for each output section. Each entry is a set of cost values $\{W_i^{IN}\}$ or $\{W_i^{OUT}\}$ for the corresponding input or output section, respectively. In particular, the entry for each input section is a set of cost values $W_i^{IN}$ reflecting the current usage of all of the liks between itself and each of the center sections. Similarly, the entry for each output section is a set of cost values $W_i^{OUT}$ reflecting the current usage of all of the links between itself and each of the center sections. When a new call request arrives, the interconnection network controller determines which input section and which output section correspond to the call request. The controller then passes the set of $W_i^{IN}$ values for the appropriate input section and the set of $W_i^{OUT}$ values for the appropriate output section to the neural network. The neural network solution then either computes a route for the call through the interconnection network or indicates that no route exists. This information is passed back to the interconnection network controller which either rejects the call if no route exists or physically routes the call through the interconnection network using the network control interface. The interconnection network controller also enters the new state of the interconnection network into its two tables.

The invention therefore provides a neural network solution for routing calls through a three stage interconnection network. The solution uses fixed interconnection weights for the neural network and fewer neurons than previous solutions, i.e., only a single neuron per center section. The neural network solution can preferentially place calls in the interconnection network, and by using a reset circuit to initialize the inputs of the neurons, the preferential placement of calls can be guaranteed. If a reset circuit is not used, then the final state from the last call can be used as the initial state for the new call, which results in a near perfect realization of preferential call placement.

While embodiments of the invention have been described in detail, various modifications and other embodiments thereof may be devised by one skilled in the art without departing from the spirit and scope of the invention, as defined in the appended claims.

What is claimed is:

1. A system for routing calls, comprising:
an interconnection network including input, center and output stages each having a plurality of call switching sections, said center stage having n switching sections, and a plurality of links connecting said input, center and output stage switching sections, such that there is one link between each input stage switching section and each center stage switching section and one link between each center stage switching section and each output stage switching section;
a neural network including n amplifiers, each representative of an individual one of said n center stage switching sections and having an input and an output, coupled to one another by interconnection weights $T_{ij}$ that are the value or weight of a connection from the output from the jth amplifier to the input to an ith amplifier and that have values such that $T_{ij}=T_{ji}$ and $T_{ii}=0$, said amplifiers generating outputs $v_i$, where $v_i$ is the output from the ith amplifier, and receiving at their inputs external inputs $I_i$, where $I_i$ is the external input to the ith amplifier, the values of said external inputs $I_i$ and of said interconnection weights $T_{ij}$ determining the operational characteristics of said neural network, said neural network having an energy function E defined by $$E = -\frac{1}{2} \sum_{\substack{i=1 \\ j \neq i}}^{n} \sum_{j=1}^{n} T_{ij} v_i v_j - \sum_{i=1}^{n} I_i v_i,$$

said energy function converging to an equilibrium point in accordance with the current state of said neural network and the current values of said external inputs $I_i$; and a controller for sensing each call currently being routed through said interconnection network and the route of each call through said interconnection network, for operating said interconnection network to route calls through said interconnection network, and for providing said external inputs $I_i$ to and for receiving said outputs $v_i$ from said neural network, said controller maintaining cost or energy values $W_i^{IN}$ and $W_i^{OUT}$ for the links coupled to each input stage switching section and for the links coupled to each output stage switching section, respectively, where $W_i^{IN}$ represents the cost of using the link between a particular input stage switching section and the ith center stage switching section and $W_i^{OUT}$ represents the cost of using the link between a particular output stage switching section and the ith center stage switching section, such that if a link is not being used and is available for use in routing a new call through said interconnection network its cost $W_i^{IN}$ or $W_i^{OUT}$ is assigned a selected first cost or energy value $S_i/2$, where $S_i/2 \geq 0$, and if a link is being used and is not available for use in routing a new call its cost $W_i^{IN}$ or $W_i^{OUT}$ is assigned a selected second and greater cost or energy value $L/2$, where $L/2 > 0$ and $L > S_i$, whereby the values of $W_i^{IN}$ and $W_i^{OUT}$ are in accordance with and represent the current usage of said links of said interconnection network, said controller receiving a request to route a new call through said interconnection network from a particular input stage switching section to a particular output stage switching section and in response to the request generating and applying to said amplifiers of said neural network external inputs $I_i$ that have values in accordance with respective costs $W_i^{IN}$ and $W_i^{OUT}$ associated with the links coupled to the particular input and output stage switching sections, said energy functions E of said neural network converging, in response to the current state of said neural network and to the current values of said external inputs $I_i$ and if a route through said interconnection network exists, to an equilibrium point at which said outputs $v_i$ from its amplifiers represent a particular center stage switching section between which and each of the particular input and output stage switching sections there is an available link and through which particular center stage switching section the new call is to be routed over the available links, said controller being responsive to said outputs $V_i$ to operate said interconnection network to route the new call through such particular center stage switching section, said energy function E of said neural network converging to a null state if a route through said interconnection network does not exist, at which said outputs $v_i$ represent that there is no center stage switching section available for routing the new call, wherein in operation of said neural network $dE/dt \leq 0$ for all time and $dv_i/dt=0$ at asymptotically stable equilbrium points for said energy fucntion E, wherein said neural network has a binary threshold and the output $v_i$ of an amplifier is either zero or one and indicates, upon said neural network reaching an equilibrium point following a new call request, whether the corresponding ith center stage switching section is to be used to route the new call, such that when $v_i=1$ the corresponding center stage switching section is to be used to route the new call and when $v_i=0$ the corresponding center stage switching section is not to be used to route the new call, the outputs of said amplifiers in the equilibrium state of said neural network being such that there is exactly one amplifier with an output of one if there is a center stage switching section available for use in routing a new call through said interconnection network and such that all of said amplifiers have an output of zero if there is no center stage switching section available for use in routing a new call through said interconnection network, wherein said neural network interconnection weights are defined by $$T_{ij} = \begin{cases} -G \text{ if } i \neq j \\ 0 \text{ if } i = j \end{cases}$$

where G is a positive constant chosen such that $G<L/2$ and $G>S_i$ for each i, wherein said external inputs provided by said controller to said neural network are defined by $$I_i = -(W_i^{IN} + W_i^{OUT}) + G,$$

and wherein said neural network energy function E also is defined by $$E = \sum_{i=1}^{n} (W_i^{IN} + W_{iSUP}^{OUT}) v_i + \frac{G}{2} \left( \sum_{i=1}^{n} v_i - 1 \right)^2 \frac{G}{2} \sum_{i=1}^{n} (v_i^2) \frac{G}{2},$$

which energy function encompasses the constraints of routing a new call through said interconnection network.

2. A system as in claim 1, wherein an internal input $u_i$ to the ith amplifier, is defined by $$C_i \left( \frac{du_i}{dt} \right) = \sum_{i=1}^{n} T_{ij} v_j - \frac{u_i}{\tau_i} + I_i \text{ with } v_i = g_i(u_i)$$

where $C_i$ is an input capacitance of the ith amplifier, $v_j$ is the output generated by the jth amplifier, $\tau_i$ is a resistance and $g_i()$ is a sigmoidal transfer function of the ith amplifier assuming a negligible response time.

3. A system as in claim 1, wherein the value of L is the same for all links that are being used and the values of $S_i$, for the links that are not being used, are assigned such that $S_i<S_j$ to thereby favor selection by said neural network of any particular center stage switching section i over any other center stage switching section j for use in routing a call through said interconnection network, so that said system implements preferential call placement through said interconnection network.

4. A system as in claim 1, wherein the value of L is the same for all links that are being used and $S_i<S_j$ for all $i<j$, so that said system implements preferential call placement that favors selection of the lowest numbered unused center stage switching section for use in routing a call through said interconnection network.

5. A system as in claim 1, wherein the value of L is the same for all links that are being used and the values of $S_i$ are set equal to a constant S for all links that are not being used, so that calls are distributed uniformly through said center stage switching sections.

6. A system for routing calls, comprising:
an interconnection network including input, center and output stages each having a plurality of switching sections that connect each of x inputs to a section to any one of y outputs from the section with no two inputs being connected to the same output, and a plurality of links connecting outputs from said input sections to inputs to said center sections and connecting outputs from said center sections to inputs to said output sections, such that one link extends between each input section and each center section and one link extends between each center section and each output section, said interconnection network being operable to route calls from inputs to said input sections to outputs from said output sections via said links and said center sections with no two calls using the same link;

a neural network including a plurality of neurons coupled to one another by interconnections having interconnection weights $T_{ij}$ that are the value or weight of the connection from the output of the jth neuron to the input to the ith neuron and quantify the influence of neuron j on neuron i, said interconnection weights having values such that $T_{ij}=T_{ji}$ and $T_{ii}=0$, said neural network being adapted to receive external inputs $I_i$, where $I_i$ is the external input to the ith neuron, and generating outputs $v_i$, where $v_i$ is the output of the ith neuron, said neural network having an energy function E defined by $$E = \frac{1}{2} \sum_{\substack{i=1 \\ j \neq i}}^{n} \sum_{j=1}^{n} T_{ij} v_i v_j - \sum_{i=1}^{n} I_i v_i,$$

said energy function converging to an equilibrium point in accordance with the current state of said neural network, the values of the interconnection weights $T_{ij}$, and the current values of said external inputs $I_i$; and a controller coupled to said interconnection network and to said neural network for sensing [the current usage of and] each call currently being routed through said interconnection network and the route of each call through said interconnection network, for operating said interconnection network and for applying said external input $I_i$ to and for receiving outputs $v_i$ from said neural network, said controller sensing whether the individual links of said interconnection network are or are not being used to route a call through said interconnection network and assigning to each link an energy value representative of whether the link is or is not being used, where $W_i^{IN}$ is the energy value of the link between a particular input stage switching section and the ith center stage switching section and $W_i^{OUT}$ is the energy value of the link between a particular output stage switching section and the ith center stage switching section and the values of $W_i^{IN}$ and $W_i^{OUT}$, for links that are not being used to route a call, are smaller than the values of $W_i^{IN}$ and $W_i^{OUT}$ for links that are being used to route a call, said controller, in response to a request to route a call through said interconnection network from an input to a particular input section to an output from a particular output section via a center section, generating external inputs $I_i$ having values in accordance with the energy values assigned to the links coupled to the particular input section and to the particular output section and applying said external inputs $I_i$ to said neural network so that said neural network converges and generates outputs $v_i$ having values in accordance with the initial state of said neural network and the values of said external inputs $I_i$, said energy function of said neural network also being defined by being $$E = \sum_{i=1}^{n} (W_i^{IN} + W_i^{OUT})v_i + \frac{G}{2}\left(\sum_{i=1}^{n} v_i - 1\right)^2 - \frac{G}{2}\sum_{i=1}^{n}(v_i^2) - \frac{G}{2}$$

where G is a positive constant that has a value which is less than the value of either $W_i^{IN}$ or $W_i^{OUT}$ of a link that is being used and is greater than the value of either $W_i^{IN}$ or $W_i^{OUT}$ of any link that is not being used, so that said neural network outputs $v_i$ represent the particular center stage switching section to be used to route the new call, said controller receiving said neural network outputs $v_i$ and operating said interconnection network to route the new call through said particular center stage switching section represented by said neural network outputs $v_i$.

7. A system as in claim 6, wherein said interconnection weights have values defined by $$T_{ij} = \begin{cases} -G \text{ if } i \neq j \\ 0 \text{ if } i = j \end{cases}$$

and said external inputs have values defined by $$I_i = -(W_i^{IN} + W_i^{OUT}) + G.$$

8. A method of routing calls through an interconnection network that includes input, center and output stages, each having a plurality of call switching sections and the center stage having n call switching sections, and a plurality of links between the stages, such that there is one link between each input stage switching section and each center stage switching section and one link between each center stage switching section and each output stage switching section, said method comprising the steps of:

providing a neural network that has n amplifiers, each representative of an individual one of the interconnection network center stage switching sections, which amplifiers are coupled together by interconnection weights $T_{ij}$ that are the value or weight of the connection from the output of the jth amplifier to the input to the ith amplifier and which amplifiers also are adapted to receive external inputs $I_i$, where $I_i$ is the external input to the ith amplifier, the neural network having an energy function E defined by $$E = \frac{1}{2}\sum_{\substack{i=1 \\ j \neq i}}^{n}\sum_{j=1}^{n} T_{ij}v_iv_j - \sum_{i=1}^{n} I_iv_i,$$

assigning energy values $W_i^{IN}$ and $W_i^{OUT}$ to the links coupled to each input stage switching section and to each output stage switching section, respectively, where $W_i^{IN}$ represents the energy involved in using the link between a particular input stage switching section and the ith center stage switching section and $W_i^{OUT}$ represents the energy involved in using the link between a particular output stage switching section and the ith center stage switching section, such that if a link is not being used and is available for use in routing a new call through the interconnection network its assigned energy value $W_i^{IN}$ or $W_i^{OUT}$ is a selected energy value $S_i/2$, where $S_i/2 \geq 0$, and if a link is being used and is not available for use in routing a call its assigned energy value $W_i^{IN}$ or $W_i^{OUT}$ is a selected energy value $L/2$, where $L/2 > 0$ and $L > S_i$, whereby the values of $W_i^{IN}$ and $W_i^{OUT}$ represent the current usage of the interconnection network;

providing a further energy function E of the neural network that is defined by $$E = \sum_{i=1}^{n}(W_i^{IN} + W_i^{OUT})v_i + \frac{G}{2}\left(\sum_{i=1}^{n} v_i - 1\right)^2 - \frac{G}{2}\sum_{i=1}^{n}(v_i^2) - \frac{G}{2},$$

by providing values for the interconnection weights such that $$T_{ij} = \begin{cases} -G \text{ if } i \neq j \\ 0 \text{ if } i = j \end{cases}$$

where G is a positive constant chosen such that $G \leq L/2$ and $G > S_i$ for all i, and by generating and applying to the neural network in response to a request to route a new call through the interconnection network from a particular input stage switching section to a particular output stage switching section, external inputs $I_i$ that have values defined by $$I_i = -(W_i^{IN} + W_i^{OUT}) + G;$$

applying to the neural network external inputs $I_i$ that are generated in response to a request to route a new call through the interconnection network to cause the neural network to converge, in accordance with the current state of the neural network and the current values of the external inputs $I_i$, to an equilibrium point at which outputs $v_i$ generated by the neural network amplifiers, where $v_i$ is the output from the ith amplifier, represent, if a route through the interconnection network is available, a particular center stage switching section between which and each of the particular input and output stage switching sections there is an available link and through which particular center stage switching section the new call is to be routed; and operating the interconnection network, in response to the neural network amplifier outputs $v_i$, to route the new call through such particular center stage switching section.

9. A method as in claim 8, wherein said step of providing a neural network provides a neural network in which an internal input $u_i$ to the ith amplifier is defined by $$C_i\left(\frac{du_i}{dt}\right) = \sum_{j=1}^{n} T_{ij}v_j - \frac{u_i}{\tau_i} + I_i \text{ with } v_i = g_i(u_i)$$

where $C_i$ is an input capacitance of the ith amplifier, $v_j$ is the output generated by the jth amplifier, $\tau_i$ is a resistance and $g_i(\ )$ is a sigmoidal transfer function of the ith amplifier assuming a negligible response time.

10. A method as in claim 8, wherein said neural network providing step provides a neural network that has a binary threshold, in which the output $v_i$ of an amplifier is either zero or one, and in which the output $v_i$ of an amplifier, upon the neural network reaching an equilibrium point following a request to route a new call, indicates whether the corresponding ith center stage switching section is or is not to be used to route the new call, such that when $v_i = 1$ the corresponding center stage switching section i is to be used to route the new call and when $v_i = 0$ the corresponding center stage switching section i is not to be used to route the new call, the outputs of the amplifiers in the equilibrium state of the neural network being such that exactly one amplifier has an output of one if there is a center stage switching section available for use in routing the new call through the interconnection network and such that all of the amplifiers have an output of zero if there is no center stage switching section available for use in routing the new call through the interconnection network.

11. A method as in claim 8, wherein said assigning step comprises assigning the same value of L to all interconnection network links that are being used, and assigning values of $S_i$ to all links that are not being used, such that $S_i < S_j$, to thereby implement preferential call placement through the interconnection network and favor selection by the neural network of any particular center stage switching section i over any other center stage switching section j for use in routing a new call through the interconnection network.

12. A method as in claim 11, wherein said assigning step comprises assigning values to $S_i$ such that $S_i < S_j$ for all $i < j$, thereby to implement preferential call placement that favors selection of the lowest numbered unused center stage switching section for use in routing a call through the interconnection network.

13. A method as in claim 8, wherein said assigning step comprises assigning the same value of L to all links that are being used to route a call and setting the values of $S_i$ to a constant S for all links that are not being used to route a call, so that calls are distributed uniformly among the center stage switching sections.

* * * * *